Patented Oct. 18, 1927.

1,645,848

UNITED STATES PATENT OFFICE.

HENRI BARTHÉLEMY, OF PARIS, FRANCE, ASSIGNOR TO THE SOCIETE INDUSTRIELLE DES MATIERES PLASTIQUES, OF PARIS, FRANCE

PROCESS FOR THE MANUFACTURE OF THE CONDENSATION PRODUCTS OF UREA AND OF FORMALDEHYDE.

No Drawing. Application filed November 23, 1925, Serial No. 70,998, and in France December 16, 1924.

The known methods provide for the production of the two methylol ureas;

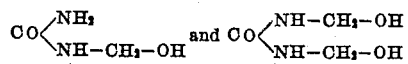

by performing the condensation of formic aldehyde and urea in an aqueous environment at 75–85 degrees F. in the presence of barium hydroxide, while introducing into the mass a current of carbon dioxide after the reaction has been set up, in order to destroy the action of the base.

The present invention consists in the use of natural carbonate of calcium which is ground to an impalpable powder, and in the use of precipitated and washed calcium carbonate, magnesium carbonate and the alkali earth carbonates in general, which are prepared in like conditions and for the same purpose. It has been found that when the solutions are brought to the boiling point, a small amount of carbon dioxide will be disengaged, while at the same time the condensation takes place between the resulting methylol-ureas, with elimination of water.

Herein it is to be supposed that a condensation of lactonic form takes place, this condensation being quite analogous to what is afforded by saligenin. As a result there is obtained a new compound having a very large molecule, which is soluble in water and is to be classed as to its general properties among the lyophile colloids, that is, a colloid which tends to remain dispersed, hold water or remain in solution; such colloids being reversible or irreversible according to the acidity or the $P_H$ of the environment in which they are found.

It is known in fact that the properties of such colloids depend entirely upon the $P_H$ of their solutions. But it has been found that in conditions of temperature and also of hydration which have been suitably predetermined by the evaporation of a known quantity of solvent, the new complex body is quite reversible for instance for a value of $P_H$ between 8, 6 and 10, according to the following table, and it becomes clearly irreversible at 120° F. for a value of $P_H$ between 1 and 4.

| $P_H$ | Corresponding concentration in H-ions. |
|---|---|
| 8.6 | $\dfrac{3.98}{10^8}$ |
| 10 | $\dfrac{I}{10^{10}}$ |
| 1 | $\dfrac{I}{10}$ |
| 4 | $\dfrac{I}{10^4}$ |

But it has been further observed that this last change in the $P_H$ will bring about in certain conditions the spontaneous elimination of the water of hydration by synæresis, and that the resulting product from this operation consists of an amorphous mass of a hard and horn like nature and a conchoidal fracture, decomposing without fusion at about 500 degrees Fahrenheit. This mass is to a certain extent analogous to the one obtained by Einhorn and Hamburger by the use of acids, and chiefly hydrochloric acid. (Berichte der Deutsche Chemische Gesellshaft, v. 41, pp. 24–27); Goldschmidt (Chem. Cent. Bl. 1897, pp. 11, 194, 737), (Chem. Z. 21,460, D. R. P. 97,164) and (Schweiz. Chem. Ztg. 1924, pp. 240–242).

The said mass when in the dry state can be cut into shape, milled or filed, and can be polished with facility. It can be employed for the manufacture of various objects of a transparent or translucent nature, according to the final chemical state of the environment, such objects resembling the products of condensation of phenol and formaldehyde, but being superior to the latter from the fact that they are colourless and that their aspect cannot be changed by the action of light and heat.

The said product may have added thereto considerable amounts of organic or inorganic substances during its manufacture, in order to change its properties or to reduce the cost. For instance, the addition of coloring agents or pigments permits various shades and different surface appearances or effects to be obtained.

I may manufacture the said product for example in the following manner:

I intimately mix one molecule of urea (corresponding to 60 parts by weight) with one or two molecules of formic aldehyde—used as a 30 per cent solution, for instance (each molecule of formaldehyde solution corresponding to 100 parts by weight of 30% solution)—and I add thereto 6 per cent of the total weight of freshly precipitated and washed calcium carbonate, preliminarily dried in vacuo at 150° F., and the resulting reaction mixture is allowed to stand at 170° for 4 hours; it is then boiled for 4 hours.

After filtering, I obtain a sirup which may be more or less concentrated in vacuo, and the result is either an amorphous dry extract which is hygroscopic and soluble in water, or a thick gum having the consistency of mucilage. I may change the $P_H$ of said gummy solution by the use of a well proportioned acid solution, such as hydrochloric acid, or a known "tampon" solution having a determined $P_H$ value, whereby the new colloid body will be spontaneously transformed into an irreversible colloid by heating to some 195° F.; a "tampon" solution being a solution of a weak acid and a salt thereof, or a weak base and a salt of the base.

For the production of the moulded and polished objects, the operation is performed by the use of molds of metal, glass or like rigid and non-porous material.

I claim:

1. A process of manufacturing condensation products from urea and formaldehyde, comprising the steps of mixing together urea and formaldehyde; adding an alkali earth carbonate to the mixture; and then boiling the resultant reaction mixture.

2. A process of manufacturing condensation products from urea and formaldehyde, comprising the steps of mixing together urea and formaldehyde; adding an alkali earth carbonate to the mixture; allowing the resultant reaction mixture to stand for a time; and then boiling said reaction mixture.

3. A process according to claim 2, in which the reaction mixture is allowed to stand for 4 hours and then boiled for 4 hours.

4. A process of manufacturing condensation products from urea and formaldehyde, comprising the steps of mixing together urea and formaldehyde; adding an alkali earth carbonate to the mixture; allowing the resultant reaction mixture to stand for a time; boiling said reaction mixture; and then concentrating in vacuo the syrup obtained after the boiling step.

5. A process of manufacturing condensation products from urea and formaldehyde, comprising the steps of mixing together urea and formaldehyde; adding an alkali earth carbonate to the mixture; allowing the resultant reaction mixture to stand for a time; boiling said reaction mixture; filtering the syrup thereby obtained; and then concentrating the filtered syrup in vacuo.

Signed at Paris, in the county of Seine and State of France, this 5th day of November A. D. 1925.

HENRI BARTHÉLEMY.